Patented May 10, 1932

1,858,019

UNITED STATES PATENT OFFICE

LEON LILIENFELD, OF VIENNA, AUSTRIA

MANUFACTURE OF ARALKYL ETHERS OF CELLULOSE AND PLASTICS CONTAINING SAME

No Drawing. Application filed February 28, 1924, Serial No. 695,854, and in Austria April 1, 1919.

My prior U. S. Patent No. 1,188,376 of June 20, 1916, describes and claims certain new substances, alkyl ethers of cellulose and of its derivatives and conversion products. The present invention is concerned with the aralkyl ethers, of which the benzyl ethers are hereinafter more particularly referred to, as specific examples of said class of substances. With the alkyl ethers, as stated in said prior patent, those in which a small number of the hydrogen atoms of the hydroxyl groups are replaced by alkyl radicals are soluble in cold water, whereas those ethers in which substantially all such hydroxyl hydrogen atoms are so replaced, are wholly insoluble in water, but are soluble in a great number of organic solvents. In contradistinction to this no aralkyl ethers of cellulose exist that are soluble in water. Aralkyl ethers (for instance benzyl ethers of cellulose of lower degrees of aralkylation (i. e. such aralkyl ethers as contain only a small number of aralkyl groups) are insoluble both in water and in organic solvents whilst aralkyl ethers of cellulose of higher degrees of aralkylation (i. e. in which a great number of, or all hydroxyl hydrogen atoms of the cellulose are replaced by aralkyl groups) are insoluble in water, but readily soluble in a large range of organic solvents as benzene, toluene, xylene, chloroform, tetrachloroethane etc. The solutions of such aralkyl ethers of cellulose, on drying, leave behind clear, transparent flexible films which display a remarkable resistance to water at all temperatures. Their dielectric constant is exceedingly low which circumstance renders them highly suitable for the production of insulating goods.

In general, the production of aralkyl ethers of cellulose, may be readily accomplished by causing aralkyl esters of inorganic acids, to act on cellulosic bodies or materials containing the same, in the presence of alkalies, or causing said esters to act on alkali-celluloses or alkali compounds of cellulose derivatives or conversion products. As a particular mode of producing the aralkyl ethers, I would mention the substitution of an aralkyl ester in place of the alkyl ester in Example 11 of said prior U. S. Patent 1,188,376, namely by reacting upon a soda cellulose with benzyl chlorid.

As a specific example of this, I first prepare an alkali cellulose as described in Examples 1 and 2 of my copending application Serial No. 436,604, filed Jan. 11, 1921 (of which case the present is in part a continuation) namely as follows:

*Example 1.*—100 kilogrammes cellulose are impregnated with 500 to 1000 kilogrammes of an 18% caustic soda solution and allowed to stand for from one to three days at room temperature (ageing operation).

The mass is then freed from the excess of alkali solution in a suitable machine such as a press or a suction apparatus or centrifuge until the residue has a weight of from 180 to 200 kilogrammes.

The residue is then finely divided by means of any suitable apparatus, e. g., a willowing machine, edge runner, or shredder, advantageously while cooling, whereupon 200 to 300 kilogrammes solid caustic soda, preferable in the form of powder are added, either in one portion or gradually. The mass is made uniform by continued stirring, kneading, grinding, shredding or the like. If it is desired wholly to prevent any splitting up of the cellulose, then it is advisable to cool it during the incorporation of the caustic alkali.

The final product is a fine fibrous, or pulverulent, completely uniform material. This final product may theoretically contain (with 100 parts of original cellulose).

65.6 to 82 parts of water
14.4 to 18 parts of caustic soda (from the solution)
200 to 300 parts of caustic soda (added dry) in 380–480 to 400–500 parts of alkali cellulose.

In these four instances, the alkali cellulose theoretically has:

(*a*) In 380 parts, about 17.1% $H_2O$ and about 56.4% NaOH,
(*b*) In 480 parts, about 13.6% $H_2O$ and about 65.5% NaOH,
(*c*) In 400 parts, about 20.5% $H_2O$ and about 54.5% NaOH, or (d) In 500 parts, about 16.4% H₂O and about 63.6% NaOH.

When pressing out the excess solution, the remaining solution has a somewhat greater strength than the part pressed out, hence the final products may actually contain somewhat less water and somewhat more caustic alkali than the above amounts.

*Example 2*.—100 kilogrammes cellulose is impregnated with 500 to 1000 kilogrammes of a 30% caustic soda solution and allowed to stand for a suitable period, for example, 6 to 48 hours.

It is then pressed, separated or filtered by suction until it has a weight of 180 to 240 kilogrammes H₂O and 24 to 42 kgs. NaOH, and the pressed material finely divided, preferably while cooling, after which solid caustic soda, preferable in powder form is added gradually with continuous stirring, kneading, shredding, tearing and the like. The amount of added caustic soda will correspond with the amount in the previous example.

The final products of this example, when the added NaOH is 200 to 300 kilos, as in the first example, would likewise contain, theoretically, with 100 parts of cellulose, 56 to 98 parts of water (from the solution) 24 to 42 parts of NaOH (from the solution) 200 to 300 parts of NaOH (added dry) in 380–480 to 440–540 parts of alkali cellulose. These four instances would theoretically show the following percentages:

(e) In 380 parts, about 14.7% H₂O and 59% NaOH, (f) In 480 parts, about 11.6% H₂O and 67.5% NaOH, (g) In 440 parts, about 22.3% H₂O and 55% NaOH, or (h) in 540 parts, about 18.1% H₂O and 63.3% NaOH.

The final product is a flocculent or pulverulent mass.

In both of the above examples, water can be used in place of the caustic alkali solution.

*Example 3*.—Conversion of the alkali cellulose into the benzyl ether of cellulose. The alkali cellulose as prepared by either of the above examples, or similar alkali cellulose however prepared, is then treated with an aralkylating agent such as benzylchlorid (say 80 to 126 parts of benzyl chlorid to 40 parts of NaOH) which can be added in a thin stream or in one portion with constant stirring or kneading, and after the addition, the mixture can be heated in a closed vessel as an autoclave, or in an open vessel, or in a vessel provided with a reflux condenser to complete the reaction. Such heating may be continued for say 2 to 12 hours at 60 to 130° C. The isolating of the benzyl ethers may be executed in many ways, for example.

(a) The reaction mixture is, optionally after having been washed with water in order to remove the inorganic by-products of the reaction and, if desired, after having been dried, dissolved in benzene and the solution containing the benzyl ether and the organic by-products of the reaction, as benzyl alcohol, dibenzyl etc. is then precipitated by alcohol in which the by-products are soluble, but the benzyl ether of cellulose insoluble. The latter is then, if desired, after having been washed with alcohol or the like, or alcohol and then water, dried.

(b) The reaction mass is, as it is, or after having been washed with water or washed with water and dried, treated with an agent capable of dissolving the organic by-products of the reaction but leaving the benzyl ether of cellulose undissolved and, if desired, washed with water and dried.

(c) The reaction mixture is freed from the organic by-products by distilling it in a current of steam or under reduced pressure or both, then washed with water and dried.

The benzyl ether so formed will be found to correspond approximately to the formula $C_{12}H_{16}O_{10}.4(C_6H_5.CH_2)$ to 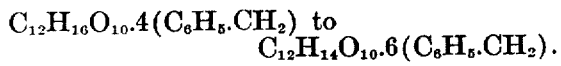
$C_{12}H_{14}O_{10}.6(C_6H_5.CH_2)$.

It is soluble in the following solvents: benzene, toluene, xylene, chloroform, tetrachloroethane and the like. It is insoluble or substantially insoluble in water and alcohol.

It is to be understood that the manufacture of the arlykyl ethers is not restricted to the method above described in which solid alkali cellulose is used, but I may use alkaline solutions of cellulosic materials as starting material, and follow the procedure as given in the examples of Patent 1,188,376, such as Examples 7 or 8 thereof, thus for instance:

*Example 4*.—(a) 3750 parts by weight of a raw viscose containing about 500 parts by weight of cellulose and about 130 to 200 parts by weight of caustic soda, are diluted with 3750 parts by weight of water, and heated with stirring on the water bath until complete coagulation has taken place. The coagulated mass which has crumbled into small lumps by the stirring, is thoroughly washed in flowing water, crushed, pressed to 5000 parts by weight, and then dissolved in 1000 parts by weight of a caustic soda solution of 50 per cent. strength. The solution may then be freed by filtering or percolation from any particles that have remained undissolved.

(b) Cellulose hydrate is precipitated by dilute sulfuric acid from a solution of cellulose in Schweizer's reagent, and is dissolved in caustic soda solution so that 120 parts of the solution contain 10 parts of cellulose hydrate and 10 parts of caustic soda.

(c) Cellulose is heated with caustic soda solution of 30–50 per cent. strength; the liquor is poured off, and the resulting cellulose hydrate is dissolved by the addition of water and preferably filtered. The solution is precipitated by dilute sulfuric acid or acetic acid, and the precipitated cellulose hydrate (preferably after previous washing) is dissolved in caustic soda solution so that 120 parts of the solution contain 10 parts of cellulose hydrate and 10 parts of caustic soda.

1200 parts by weight of the solution resulting from the treatment given under (a), (b), or (c) containing about 100 parts by weight of cellulose employed as a starting material and about 100 parts by weight of caustic soda, are gently heated, and there are then added gradually 300 parts by weight of benzyl chlorid. The addition takes about, say, from half an hour to two hours. During the addition of the benzyl chlorid the temperature of the reaction mass slowly rises to, say, 35 to 40° C. After the addition of the benzyl chlorid the heating is continued until the temperature rises up to 52 to 60° C. This after heating takes about one to two hours.

At this stage the reaction mixture (a whitish mass) contains a benzyl ether of cellulose in which a relatively small number of hydroxyl hydrogens have been replaced by benzyl radicals. Such benzyl ethers are insoluble in water and the usual organic solvents.

The mass is now rubbed up, stirred or kneaded with 300 parts by weight of powdered caustic soda or the equivalent quantity of caustic potash. Then the mass is again gently heated and into it are introduced 360 parts by weight of benzyl chlorid. The mass is heated until the temperature rises to 80 to 95° C. and kept at this temperature for half an hour to two hours.

Afterwards the reaction mass is, in the above described manner, treated again with 300 parts by weight of caustic soda and 360 parts by weight of benzyl chlorid.

The reaction mixture now containing the final product is diluted with water and shaken or stirred with benzene. The benzene-layer which contains the benzyl ether or cellulose is separated from the aqueous layer and, optionally after having been filtered, alcohol is added. On addition of alcohol under stirring the benzyl ether of cellulose precipitates. The precipitated cellulose ether is collected on a filter or a filter press, if desired, washed with alcohol and dried.

The isolation of the benzyl ether of cellulose may also be accomplished by method (b) or (c) described above.

The product of this example will be soluble in following liquids: benzene, toluene, xylene, chloroform, tetrachloroethane, or the like. It will be insoluble in water, alcohol, or the like.

Also as described in my copending case No. 436,380 (now Patent No. 1,483,738) of which the present case is a continuation in part, in each benzylating step, the ratio between the amount of cellulose under treatment, and the water present claimed there can be maintained. As described in said application, the evaporation of water from the material is effected preferably after the addition of the benzylating agent, and after the same has reacted, i. e., when the amount of free caustic alkali in the liquid is low. When so operating, heating the solution does no harm and a high temperature can be used in driving off the water. However, heating to a high temperature should preferably be avoided when considerable free alkali is present as this would cause a splitting or depolymerization of the cellulose.

As is fully described in application No. 436,380 the carrying out of the reactions while in the presence of only restricted amounts of water, makes possible the use of only a small excess of alkali over the theoretical amount (or even without any excess in some cases) and hence makes possible the etherification with a correspondly small excess of the etherifying reagents (i. e. the amount of benzyl chlorid can be calculated upon the amount of alkali present in the reacting masses) thereby effecting a great saving in the cost of alkali and etherifying agents to be used in producing the cellulose ethers.

As to the cellulosic starting material to be used, pure cellulose or materials containing cellulose can be used, such as sulfite cellulose (sulfite wood pulp) wood pulp made by the soda process, cotton fiber, cotton linters, and the like, or cellulose derivates as mentioned in my prior cases above referred to. As examples of alkali soluble conversion products or derivatives of cellulose there may be employed amongst other substances, raw or purified viscose of any degree of reversion (for instance a solution of cellulose exanthate or the like produced according to the process described in Patent No. 1,379,351), further, alkali-soluble cellulose-hydrates (acid cellulose and the like) such as are obtained by the treatment of all kinds of cellulose with hot solution of caustic alkali or Schweizer's reagent; further, the alkali-soluble hydrocellulose (Flechsigs amyloid, Ekströms acid-cellulose, Guignet-cellulose and the like) which are obtained by treating cellulose with strong mineral acids and water-precipitation: the cellulose depolymerization products such as are obtained by treating cellulose with zinc-halids separately or together with acids, and subsequent precipitation; further, the alkali-soluble conversion products which are produced by the action of saponifying agents upon cellulose-esters; the cellulose-hydrates produced by extensive heating of viscose according to German Patent No. 155.745; artificial silk waste, etc.

The alkali added in the successive etherification steps, can be added as solid caustic alkali, although it is also permissible to add the alkali (or a part of it) in the form of a concentrated aqueous or alcoholic solution. When adding solid alkali, it is preferable to grind or knead the solid caustic alkali into the partly etherified cellulosic material. During this operation it is advisable to prevent excessive rise in temperature or local overheating, by external cooling, since such overheating would be likely to cause a splitting or depolymerization and thereby would lower the quality of the ultimate product.

In conducting the etherification reaction, it is usually necessary to heat the material more or less depending on the particular etherifying agent to be used. The reaction can be conducted in an open vessel or a vessel provided with a reflux condenser, or in a pressure vessel such as an autoclave or bomb. It is further to suitably agitate or knead the reaction mixture during the reaction.

A further example including the removal of water after the first benzylating step (derived from my copending application Ser. No. 436,380) is as follows:

*Example 5.*—1200 parts by weight of an alkaline aqueous solution of an alkali-soluble cellulose-derivative or conversion product, for instance of the cellulose xanthogenate (described in Patent No. 1,379,351) or of a viscose purified by an older process, for instance by salts or salts and acids, alcohols or the like, or a cellulose hydrate produced, by treating cellulose with a hot solution of caustic alkali or with Schweizer's reagent, and subsequent precipitation or of the cellulose hydrate produced by heating from viscose according to the process described in German Patent No. 155,745 or of a hydrocellulose (amyloid, acid-cellulose, Guignet-cellulose and the like) produced by treatment of cellulose with strong sulphuric acid, or of another cellulose hydrate or the like containing about 100 parts by weight of cellulose employed as a starting material and about 100 parts by weight of caustic soda, are gently heated, and there are then added gradually 300 parts by weight of benzyl chlorid. The addition takes about, say, from half an hour to two hours. During the addition of the benzyl chlorid the temperature of the raaction mass slowly rises to, say, 35 to 40° C. After the addition of the benzyl chlorid the heating is continued until the temperature rises up to 52 to 60° C. This afterheating takes about one to two hours.

The mass now has the consistency of a white salve which contains besides the byproducts the low etherified benzyl ether of cellulose which is insoluble in water and the customary organic solvents. The reaction mixture is now heated either in an open vessel (evaporating dish or the like), or in vacuo (for instance in a vacuum kneading machine or the like) for the purpose of driving out the water, preferably being stirred or kneaded continuously.

As the temperature need not exceed 100° it is sufficient to use hot water or steam as a source of heat. If the water is expelled by heating under atmospheric pressure, it is preferable to use a temperature which is not below 40° C. It is however admissible to go up to 90–100° C. If the work is carried out in vacuo the temperature may be reduced to about 30 or 40° C. Of course the required expulsion of water can be obtained more easily when active stirring, or kneading is employed, both under atmospheric pressure or in vacuo even without heating, more particularly when thin layers are treated or when energetic agitating or kneading is employed, but a correspondingly longer time is required.

The expulsion of water is continued until the reaction mixture has reached a weight of 250 to 700 parts by weight (according to the degree of removal of water required and according to the quantity of benzyl chlorid used).

The resultant paste is disintegrated if necessary, or rubbed down, and if necessary passed through a sieve, whereupon (and preferably with cooling) 40 to 120 parts by weight of powdered caustic soda or the equivalent quantity of caustic potash are added in small portions while it is rubbed, stirred or kneaded. The resultant mixture is then mixed either in a closed vessel with 126 to 378 parts by weight of benzyl chlorid in one or several portions and is heated, being preferably at the same time stirred or kneaded. A steam or water bath is a sufficient source of heat. The reaction proceeds at temperatures which lie between 50 and 100° C. and is usually completed after 1 to 3 hours. To make quite sure, the heating can be continued for another 1 to 2 hours.

The final product is isolated as in Example 4. Its properties are similar to those of the benzyl ether obtained in that example.

The aralkyl ethers of cellulose can be used for various purposes, such as for making plastic compositions of the nature of celluloid-like masses, coating compositions, insulating compositions. In such compositions various additions such as filling materials, agents for increasing the plasticity (including camphor and substitutes therefor) suppleness, softness, pigments, dyes, etc. can be used, as in the known plastics from other cellulose derivatives. Volatile solvents can be used in the known manner.

Particular examples of such compositions are as follows:

*Example 6.*—Plastic celluloid-like material:—60 parts by weight of a cellulose benzyl ether soluble in benzene are mixed with 30 to 40 parts by weight of camphor and dissolved in 200 parts of benzene or chloroform, and kneaded in a vacuum kneading machine, for about two hours at a temperature of 60° C. Subsequently about half of the volatile solvent is evaporated, and the mass calendered (rolled out), dried, heated and pressed.

If desired a soluble dye or a pigment can be incorporated with the composition as given in this example. (This example is continued from my copending application 473,832 filed May 21, 1921.)

*Example 7.*—Another example of plastic compositions containing the aralkyl ethers of cellulose is the following which is continued from my prior copending application Serial No. 436,605 filed January 11, 1921 (corresponding to an Austrian application filed August 1, 1919). To 25 to 50 kgs. of one of the oils described in my copending application 436,380 of Jan. 11, 1921, are mixed 75 to 120 kgs. of water-insoluble benzyl cellulose ether with or without a solvent, and the mixture worked up in the manner usual in making celluloid-like masses.

*Example 8.*—A further example derived from said application 436,605 is the following mode of making artificial leather. 30 parts of benzyl cellulose are mixed with 20 to 35 parts of one of said oils described and claimed in Serial No. 436,382, until a uniform paste or a solution is obtained. A pigment such as lamp black may be added. Fabric, paper or the like is coated with the mixture and calendered. In making this coating mixture, a volatile solvent such as benzene or chloroform can be added if desired.

In Examples 7 and 8 benzyl ether of starch can be substituted for the benzyl ethers of cellulose. The mixture as mentioned in this latter example can also be used for covering wires or cables, as an insulating coating.

The oils referred to in these last two examples can be produced as in my copending cases 436,380 and 436,605, namely, by treating high boiling coal tar oils, i. e. any coal tar hydrocarbons having boiling points above 140° C., and especially those boiling between 140 and 220° C., with acetylene in the presence of aluminium chlorid (0.5 to 10% of the latter, based on the amount of the tar oil being treated, being a suitable proportion to employ) and distilling the reaction mixture (optionally after a previous removal or decomposition of the aluminium chloride compound). The oil has a blue fluorescence, and the fractions boiling in vacuo (for example at a pressure of 20 millimeters) between about 85° C., and about 260° C., are especially suitable for the purpose.

The fractions of tar boiling above 140° C., which have been found particularly advantageous are the higher boiling fractions of solvent naphtha, or hydrocarbons which can be isolated therefrom.

*Example 9.*—Insulating product.—600 parts by weight of a water-insoluble cellulose benzyl ether are mixed with 400 parts by weight of tricresyl phosphate or of benzyl cresylether or of a high boiling aromatic hydrocarbon such as m-dixylylethane and dissolved in 2000 parts of toluene or benzene and kneaded in a vacuum kneading machine for about two hours at a temperature of 60 to 80° C. Subsequently about half of the volatile solvents is evaporated and the mass is (a) Either calendered (rolled out) dried, heated and pressed, or (b) Applied to wires or cables by means of sutable machinery and if necessary dried.

In the former case a laminiform insulating material, in the latter a wire or cable covered with a flexible insulating sheath, is produced.

(This example is continued from my copending case 473,833, filed May 21, 1921.)

I claim:

1. A process of making aralkyl derivatives of cellulose, which comprises reacting on a cellulosic material with an inorganic acid ester of an aralkyl alcohol, in the presence of an alkali.

2. A process of making aralkyl derivatives of cellulose which comprises reacting on alkali cellulose containing more than 33% of alkali with an inorganic acid ester of an aralkyl alcohol.

3. A process of producing cellulose ethers, which process comprises first impregnating a cellulosic material with an aqueous liquid, secondly removing part of the liquid, treating the residue with caustic alkali in the solid state, and thereafter treating the product with an aralkylating reagent.

4. A process of making cellulose ethers which comprises subjecting to an aralkylating operation, a moist alkali cellulose containing more than twice as much of caustic alkali as of cellulose, such alkali cellulose also containing at least as much of cellulose as of water.

5. The process of making cellulose ethers, which comprises reacting on cellulose with an aralkylating agent in the presence of both alkali and water admixed with said cellulose, the total weight of alkali in the material used in said reaction being greater than the total weight of water in said materials.

6. Process for the manufacture of cellulose derivatives, being aralkyl ethers of cellulose, comprising treatment of a cellulosic material with an aralkylating agent in presence of a base.

7. Process for the manufacture of aralkyl ethers of cellulose, comprising treating a cellulosic material not soluble in alkali, with an aralkylating agent in presence of alkali, while restricting the water present, to not over about 7 times the weight of the cellulose.

8. As new products aralkyl ethers of cellulose being cellulosic derivatives wherein hydroxyl hydrogen of the cellulose is substituted by aralkyl.

9. As new products, aralkyl ethers of cellulose, wherein the hydroxyl hydrogens of the cellulose are partially substituted by aralkyl.

10. As new products, benzyl ethers of cellulose.

11. As new products, benzyl ethers of cellulose, wherein the hydroxyl hydrogens of the cellulose are partially substituted by benzyl.

12. As new products aralkyl ethers of cellulose being cellulosic derivatives wherein all of the hydroxyl hydrogen of the cellulose is substituted by aralkyl.

13. A cellulose derivative composition of matter containing as its characteristic cellulose derivative constituent, an aralkyl ether of cellulose.

14. A cellulose derivative composition of matter containing as its characteristic cellulose derivative constituent, a benzyl ether of cellulose.

In testimony whereof I affix my signature.
LEON LILIENFELD.

CERTIFICATE OF CORRECTION.

Patent No. 1,858,019.                                                         Granted May 10, 1932, to

LEON LILIENFELD.

It is hereby certified that error appears in the printed specification of the above numbered patent requiring correction as follows: Page 3, line 45, for the word "or" read of, and line 87, for the misspelled word "correspondly" read correspondingly; page 5, lines 18 and 42 for the number "436,380" read 436,382; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.

hydroxyl hydrogen of the cellulose is substituted by aralkyl.

9. As new products, aralkyl ethers of cellulose, wherein the hydroxyl hydrogens of the cellulose are partially substituted by aralkyl.

10. As new products, benzyl ethers of cellulose.

11. As new products, benzyl ethers of cellulose, wherein the hydroxyl hydrogens of the cellulose are partially substituted by benzyl.

12. As new products aralkyl ethers of cellulose being cellulosic derivatives wherein all of the hydroxyl hydrogen of the cellulose is substituted by aralkyl.

13. A cellulose derivative composition of matter containing as its characteristic cellulose derivative constituent, an aralkyl ether of cellulose.

14. A cellulose derivative composition of matter containing as its characteristic cellulose derivative constituent, a benzyl ether of cellulose.

In testimony whereof I affix my signature.

LEON LILIENFELD.

CERTIFICATE OF CORRECTION.

Patent No. 1,858,019.            Granted May 10, 1932, to

LEON LILIENFELD.

It is hereby certified that error appears in the printed specification of the above numbered patent requiring correction as follows: Page 3, line 45, for the word "or" read of, and line 87, for the misspelled word "correspondly" read correspondingly; page 5, lines 18 and 42 for the number "436,380" read 436,382; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.

CERTIFICATE OF CORRECTION.

Patent No. 1,858,019.  Granted May 10, 1932, to

LEON LILIENFELD.

It is hereby certified that error appears in the printed specification of the above numbered patent requiring correction as follows: Page 3, line 45, for the word "or" read of, and line 87, for the misspelled word "correspondly" read correspondingly; page 5, lines 18 and 42 for the number "436,380" read 436,382; and that the said Letters Patent should be read with these corrections therein that the same may conform to the record of the case in the Patent Office.

Signed and sealed this 21st day of June, A. D. 1932.

(Seal)

M. J. Moore,
Acting Commissioner of Patents.